United States Patent [19]

Jessop et al.

[11] 4,157,963
[45] Jun. 12, 1979

[54] MAGNETIC DEVICE FOR TREATMENT OF CALCAREOUS LIQUIDS

[75] Inventors: Edward T. Jessop, Islington; Robert C. Hanson, Weston, both of Canada

[73] Assignee: Tengam Company Limited, Etobicoke, Canada

[21] Appl. No.: 906,395

[22] Filed: May 16, 1978

Related U.S. Application Data

[63] Continuation-in-part of Ser. No. 747,142, Dec. 3, 1976, abandoned.

[51] Int. Cl.² .................................................. B01D 35/06
[52] U.S. Cl. ......................................................... 210/222
[58] Field of Search ............... 210/222, 223; 209/219, 209/223 R; 335/209, 302, 304, 305, 306

[56] References Cited

U.S. PATENT DOCUMENTS

| | | | |
|---|---|---|---|
| 2,596,743 | 5/1952 | Vermeiren | 210/222 |
| 2,652,925 | 9/1953 | Vermeiren | 210/222 |
| 2,808,932 | 10/1957 | Merwin et al. | 209/223 |
| 2,822,089 | 2/1958 | Woodruff | 209/223 |
| 3,186,549 | 6/1965 | Botstiber | 210/222 |
| 3,289,841 | 12/1966 | Qunitz | 210/223 |
| 3,325,009 | 6/1967 | Botstiber et al. | 210/222 |
| 3,355,024 | 11/1967 | Skoyles et al. | 210/222 |
| 3,389,794 | 6/1968 | Miyata | 210/222 |
| 3,439,808 | 4/1969 | Sommermeyer | 210/222 |
| 3,669,274 | 6/1972 | Hopp et al. | 210/222 |
| 3,680,705 | 8/1972 | Hopp et al. | 210/222 |
| 4,026,805 | 5/1977 | Fowler | 210/223 |

Primary Examiner—Theodore A. Granger
Attorney, Agent, or Firm—Rogers, Bereskin & Parr

[57] ABSTRACT

The invention provides a compact magnetic device for the treatment of liquids having a calcareous content to limit hard scale formations. The device comprises a magnetic source, thin magnetic plates spaced from each other and having peripheral edges and positioned to concentrate the polarity at each pole in their peripheral edges, whereby a curtain of lines of force extends between the edges.

5 Claims, 6 Drawing Figures

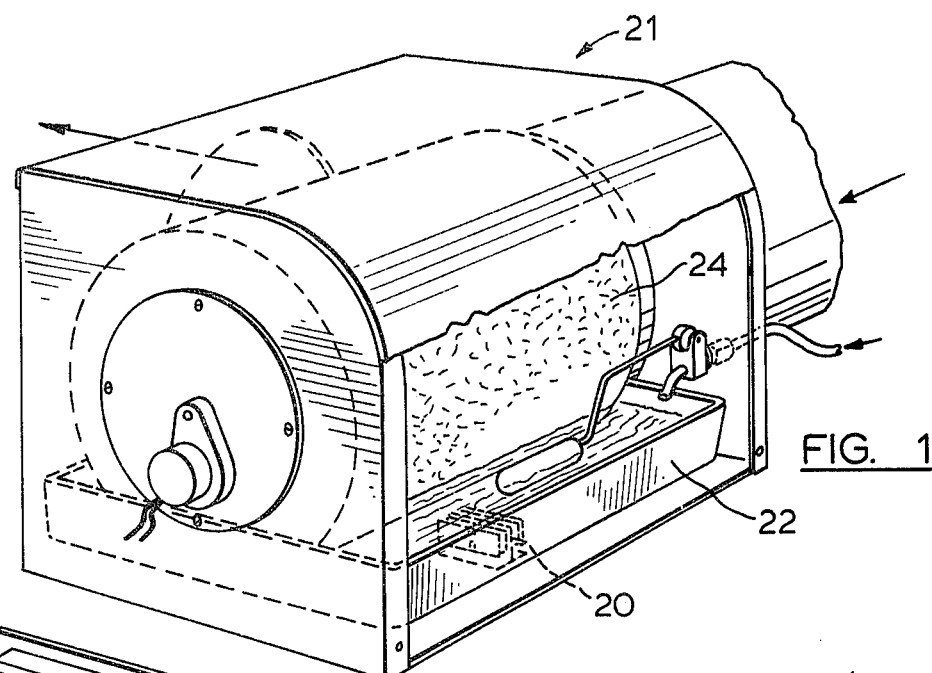
FIG. 1
FIG. 2
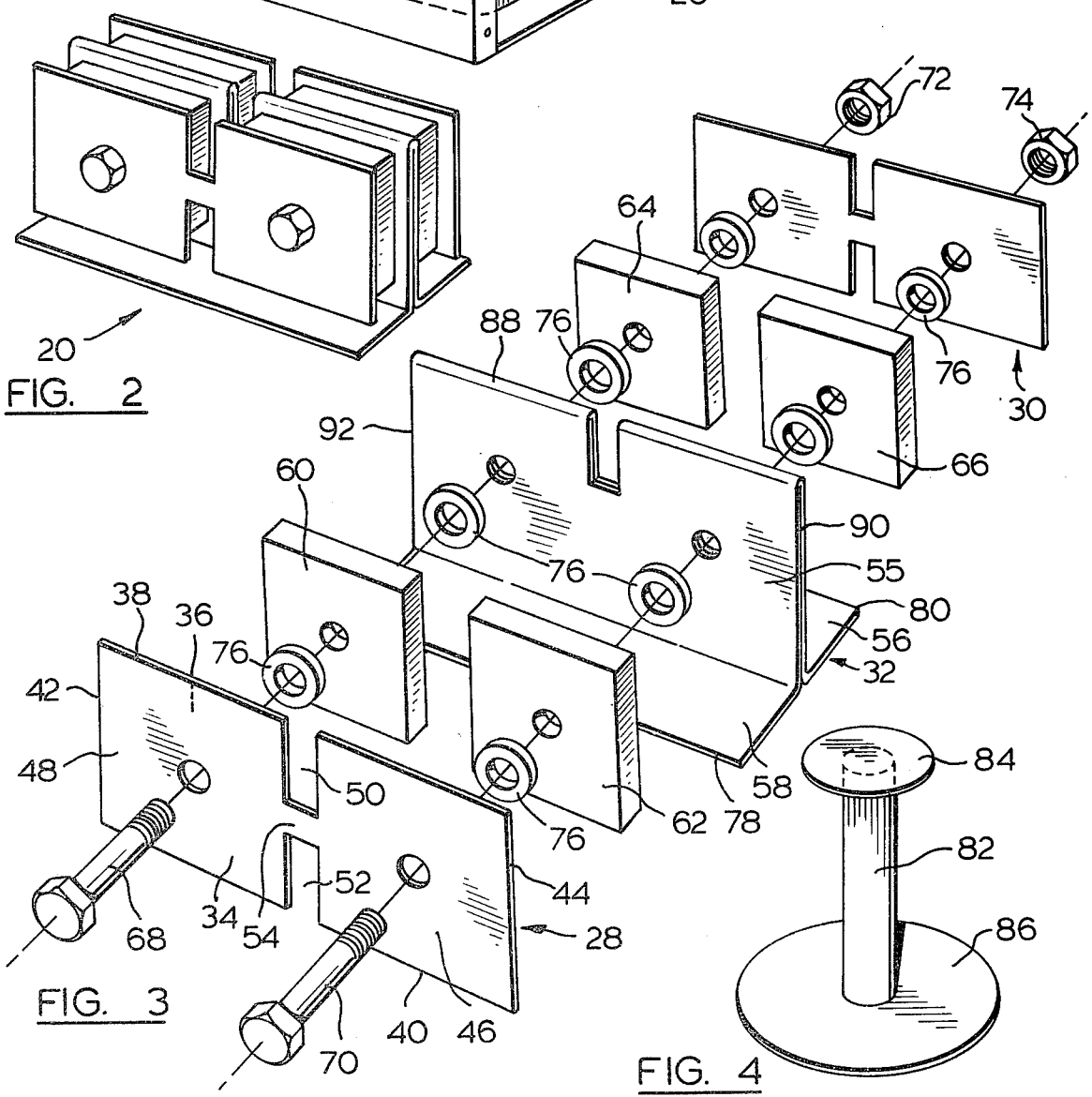
FIG. 3
FIG. 4

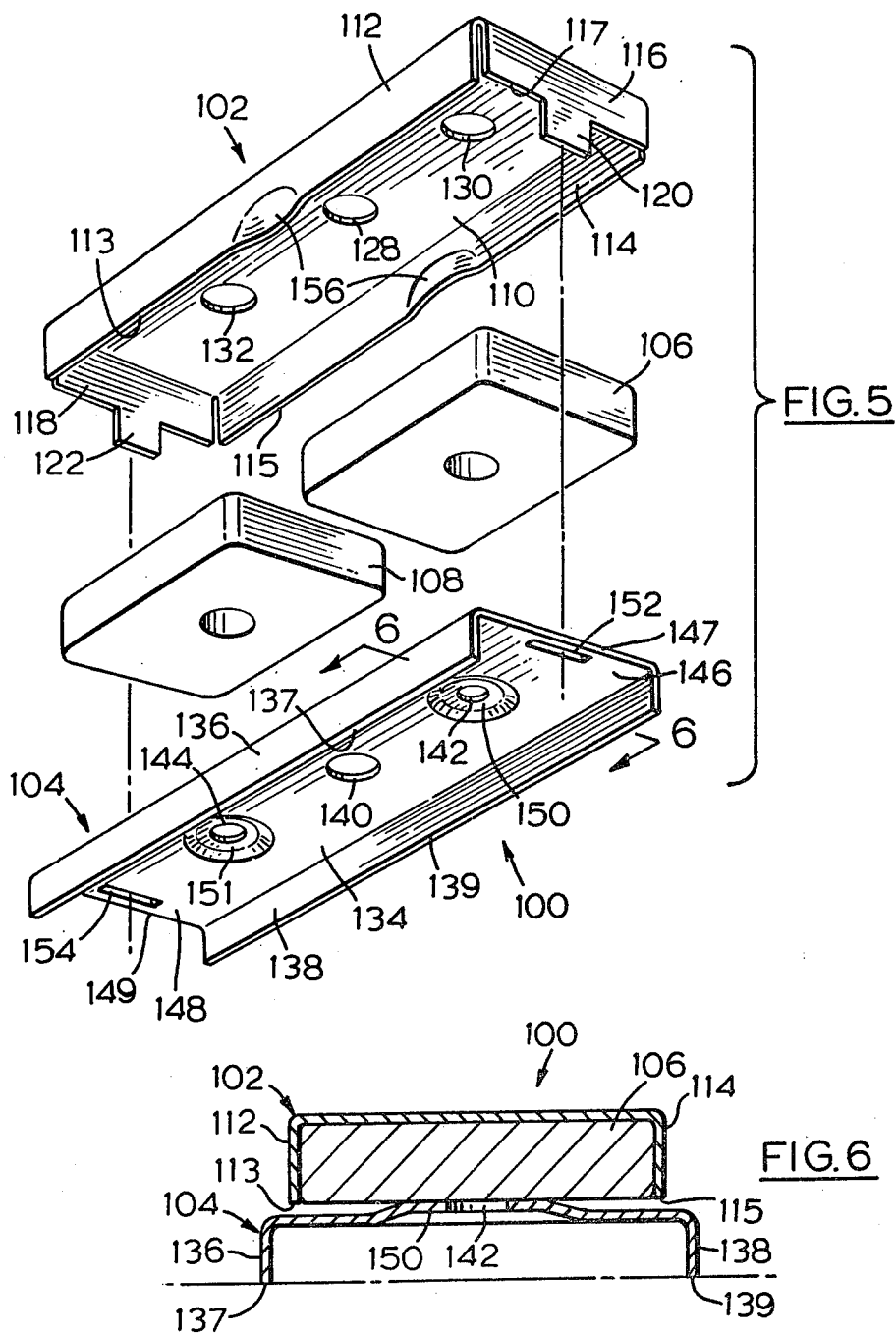

MAGNETIC DEVICE FOR TREATMENT OF CALCAREOUS LIQUIDS

This application is a continuation-in-part of application Ser. No. 747,142 filed on Dec. 3, 1976, now abandoned.

This invention relates to a device having a magnetic field for use in treating liquids having a calcareous content. It is known that such liquids, when treated magnetically, do not deposit their calcareous content as a hard scale. In addition, once the liquid has been treated magnetically, any calcareous scale formations which may have formed in the containing vessel concerned are dislodged and fall as a soft powder to the bottom of the vessel from where it can be removed.

The magnetic conditioning of liquids is already well known. A device designed to condition liquid by passing it through a magnetic field in a preferred manner is shown in U.S. Pat. No. 2,596,743 to Vermeiren. More recent devices have been designed to pass the liquid being treated perpendicular to the lines of force of a magnetic field in order to increase the effect of the field, as shown in U.S. Pat. No. 2,652,925 to Vermeiren and U.S. Pat. Nos. 3,669,274 and 3,680,705 to Happ et al.

Commonly, known devices require a forced flow of liquid and consequently, they must be installed in such a flow. The present invention is not dependent on a line flow. The above-mentioned desired results can be obtained in reservoir-type vessels by placing the present device in the bottom of such a vessel.

It has been found that the need to install the device in the flow is eliminated if a strong magnetic curtain can be created. It is the purpose of the present invention to provide an inexpensive, compact magnetic device which will attain the desired results without being installed in a flow.

For the purpose of illustrating the invention and to exemplify its use, this description will be concerned with water in a power humidifer as connected to the main duct of a furnace and having a tray, belt and pad.

The invention is intended for use in the bottom of a reservoir-type vessel, such as the humidifier tray. It thereby imparts to the water a magnetic effect such that any calcareous deposits that may have formed on any water-exposed elements, such as the belt or pad of a power humidifier, are dislodged and settle to the bottom of the tray.

It has been found that the magnetic effect can be enhanced by positioning a thin magnetic plate at one pole of a permanent magnet, thereby transferring this polarity to the plate and so concentrating the polarity at the edges of the plate. When magnetic plates are exposed to both poles of a magnet, strong lines of force are created between the edges of the plates involved. Accordingly, a strong magnetic curtain is created which will treat water as it moves by convection or by other means through this curtain.

Accordingly, a compact magnetic device is devised which utilizes thin magnetic plates to effect a strong magnetic curtain, the device comprising a permanent magnet, a thin, first magnetic plate having a first peripheral edge and positioned to concentrate the polarity at one of the poles of the magnet in said first peripheral edge, and a thin second magnetic plate lying generally parallel to the first plate and having a second peripheral edge, the second plate being positioned to concentrate the polarity at the other pole of the magnet in said peripheral edge, whereby a curtain of lines of force extends between the first and second peripheral edges.

The invention will be better understood with reference to the drawings which show various embodiments of the device, and in which:

FIG. 1 is a somewhat diagrammatic perspective view of a power humidifier using a preferred embodiment of the invention;

FIG. 2 is an enlarged perspective view of the preferred embodiment;

FIG. 3 is an exploded perspective view of the preferred embodiment;

FIG. 4 is a perspective view of a second embodiment of the invention;

FIG. 5 is an exploded perspective view of a third embodiment of the invention; and FIG. 6 is a section along line 6—6 of FIG. 5.

Reference is first made to FIG. 1 which shows the preferred embodiment 20 of the invention located in the bottom of a water-filled tray 22 of a power humidifier 21. There is always part of a humidifier pad 24 immersed in the water. In vessels containing calcareous water, the calcareous content of the water will eventually precipitate and form a hard scale on any water-exposed elements. In most instances such scale formations will hinder the operation of the apparatus concerned and thus must be removed. This can be time-consuming and expensive. As illustrated in FIG. 1 the embodiment 20 can be placed in the bottom of the vessel (in this case a humidifier tray 22) while the apparatus is still operating and the magnetic effect created in the water will remove scale which is caked on the pad 24. The calcareous deposit is dislodged in a powder form and falls to the bottom as silt for later collection and removal.

Reference is now made to FIGS. 2 and 3 with particular reference to FIG. 3. The preferred embodiment 20 includes generally rectangular side elements 28 and 30 located symmetrically on either side of a middle element 32. Side element 28, typical of both side elements 28 and 30, defines a thin, generally rectangular plate having two opposing faces 34, 36, a top edge 38, a bottom edge 40, and two end edges 42, 44 and a thickness of about 1/16 of an inch. Side element 28 is divided into two component end portions 46 and 48 by opposing slots 50, 52 which are cut from either side edge and define a neck 54 which joins component end portion 46 to component end portion 48.

Middle element 32 defines an upright center portion 55 which is similar in shape to side element 28 and which has horizontal co-planar flanges 56 and 58 dependent from the bottom edge thereof. The middle element is conveniently formed from sheet material of similar thickness to the side elements 28, 30.

Four flat, square, permanent magnets 60, 62 64 and 66 have their polarities concentrated on their major or polar faces. These faces define central openings and the magnets are arranged longitudinally in a spaced end-to-end fashion. Each arranged pair of magnets is positioned symmetrically on opposite sides of middle element 32 but inside the respective side elements 28, 30 with the same polar faces of each magnet adjacent the middle element 32. The magnets are preferably ceramic to limit corrosion problems.

Each individual magnet is located centrally with respect to the relevant component end portion of upright center portion 55 and the side elements 28 and 32 are disposed symmetrically about middle element 32. It will be evident that the magnets are also located centrally in relation to the component end portions of the adjacent side elements.

The side elements 28, 30, middle element 32, and magnets 60, 62, 64, 66 are held in their relative positions by means of fasteners 68, 70. These fasteners respectively pass through openings in the centres of adjoining component end portions of each of the side elements 28, 30 and middle element 32, and through the magnets 60, 64 and 62, 66. The fasteners 68, 70 also pass through spacers 76 which are located opposite the openings on both sides of each magnet 60, 62, 64 and 66. The fastners 68, 70 are then respectively secured by nuts 72, 74. The spacers 76 serve to maintain a gap both between the magnets and the adjacent side elements 28, 30 and also between the magnets and the middle element 32. On assembly, the side elements 38 and 30 are maintained in a perpendicular position over the respective outside edges 78 and 80 of flanges 56 and 58.

Because the magnets 60, 62, 64 and 66 are arranged with similar polar faces adjacent the upright center portion 55 of middle element 32, the opposite polar faces of the magnets are adjacent the side elements 28, 30. If it is assumed that the north polar faces of each magnet face the middle element 32, the effect is to import to the middle element 32 a north polarity which, as has been found with plate structures, will concentrate itself on the peripheral edges of middle element 32. The south polar faces, which then face adjacent side elements 28, 30, impart to them a south polarity which concentrates itself on the peripheral edges of these elements. This edge concentration creates a strong magnetic curtain extending between edges of opposite polarity.

The greater the surface area of the plate-type elements, the more peripheral edge there will be. Given magnets of the same strength however, the longer peripheral edge will decrease the strength of polarity at any one point on the edge and accordingly, decrease the strength of the magnetic curtain created. To effect a maximum area but yet maintain a strong magnetic curtain, the size of the plate-type elements are choosen relative to the strength of the magnets used.

Reference is now made to FIGS. 5 and 6 which show a further embodiment 100 of the invention. The embodiment 100 can be used in the same manner as described above with respect to embodiment 20, but is intended for use in smaller reservoirs. The embodiment 100 includes a top element 102 and a bottom element 104 and two flat rectangular permanent magnets 106 and 108.

Top element 102 is made from a thin generally rectangular plate of magnetic material and has a central portion 110, longitudinal side portions 112 and 114 and end portions 116 and 118 disposed perpendicularly from central portion 110. End portions 116 and 118 respectively have projecting tabs 120 and 122 dependent from a section of their lower edges 117 and 119. Central portion 110 further defines a central opening 128 and two further openings 130 and 132 positioned respectively, on opposite sides of opening 128 on the longitudinal centre line of central portion 110 and equidistant from opening 128 and end portions 116 and 118.

Bottom element 104 is made from a thin generally rectangular plate of magnetic material and has a central portion 134 with a width slightly greater than the width of central portion 110 of top element 102 and longitudinal side portions 136 and 138 disposed in the same directions and perpendicular to the central portion 134. Central portion 134 defines a central opening 140 and two further openings 142 and 144 positioned respectively, on opposite sides of opening 140 on the longitudinal centre line of central portion 134 and equidistant from opening 140 and ends 146 and 148. The parts of central portion 134 adjacent openings 142, 144 are raised to form a flat ring-shaped surface 150, 151 at a height above the centre portion 134 as shown in FIG. 6. The central portion 134 of bottom element 104 further defines slotted openings 152 and 154 adjacent its ends 146 and 148 respectively for receiving the tabs 120 and 122 of top element 102.

Two flat rectangular permanent magnets 106 and 108, similar to the magnets described above, have their polarities concentrated on their major faces and define central openings. Side portions 112 and 114 and end portions 116 and 118 on top element 102 define an area to receive the magnets 106 and 108 in a snug fashion with the central holes of each magnet 106 and 108 aligned coaxially with holes 130 and 132 respectively in top element 102. Side portions 112 and 114 are pinched at 156 to retain the magnets in position.

Top element 102, with magnets in place and facing down, is placed on the bottom element 104 so that the projections 120 and 122 on end portions 116 and 118 of top element 102 pass through the slotted openings 152 and 154 respectively on the bottom element 104. The tabs 120, 122 are then given a twist to couple the top and bottom elements together. When so assembled, the central opening of magnet 106 and opening 130 in top element 104 are aligned coaxially with opening 142 in bottom element 104, and the central opening of magnet 108 and opening 132 in top element 104 are aligned coaxially with opening 144 in bottom element 104. The device 100 then sits upright with the longitudinal side portions 134 and 136 of bottom element 104 serving as feet.

When assembled, the same polar face of each magnet, preferably the south polar face, is in contact with the central portion 110 of top element 102 and the opposite face of each magnet, preferably the north polar face, contacts the bottom element 104 at the flat raised parts 150, 151 as shown in FIG. 6. End portions 116 and 118 and side portions 112 and 114 of top element 102 extend downwardly towards the bottom element 104 terminating respectively at lower edges 117, 119, 113 and 115 near the lower face of each magnet. As shown in FIG. 6 these lower edges are prevented from making contact with bottom element 104 by the contact of the magnets 106 and 108 with the raised parts 150, 151 of bottom element 104.

The principle of operation of these devices will be better understood with reference to a simple embodiment shown in FIG. 4. In this embodiment, a suitable bar magnet 82 is used. A thin plate 84, of diameter greater than the diameter of the bar magnet 82 is located on one end of the bar magnet 82 and a larger thin plate 86 is located on the opposite end. It has been discovered that the poles of the bar magnet 82 concentrate themselves on the edges of the plates 84, 86 with the result that a strong magnetic curtain is created by lines of force passing between the edges of plate 84 and the edges of plate 86. The size of the magnetic curtain, in that it eminates from the plate edges, increases as the diameter of the plates increase. The strength of the magnetic curtain is dependent on plate diameter and the strength of the magnets used. For a magnet of given strength, the magnetic strength of the curtain decreases as a function of the plate diameter, or as the length of the peripheral edge increases. In the embodiment of FIG. 4, a small plate to maintain strong lines of force is employed in combination with a larger plate, the latter spreading the magnetic curtain without rendering it too weak.

A magnetic curtain similar to that described with reference to the FIG. 4 embodiment is found in embodiment 20 of the invention shown in FIG. 2. For example, with one polarity concentrated on the edges of middle element 32 and the opposite polarity concentrated on the edges of side elements 28, 30 concentrated lines of force pass between the top edge 88 of middle element 32 and the top edge 38 of side element 28; between the top edge 88 of middle element 32 and the bottom edge 40 of side element 28; between the end edge 90 of middle element 32 and the end edge 44 of side element 28; between the end edge 92 of middle element 32 and the end edge 42 of side element 32; between flange edge 78 and the bottom edge 40 of side element 32; between flange edge 78 and the top edge 38 of side element 32. Similar lines of force pass between the edges of side element 30 and the edges of middle element 32. The slots 50, 52 contained in each element 28, 30 and 32 serve to increase the length of edge available.

In embodiment 100 shown in FIGS. 5 and 6, a generally vertical magnetic curtain extends between the edges of top element 102 and the edges of bottom element 104 in which lines of force pass between top edge 113 and bottom edge 137; between top edge 115 and bottom edge 139; between top edge 117 and bottom edge 147; between top edge 119 and bottom edge 149; and the edges of openings 128, 130 and 132 of top element 102 and the edges of openings 140, 142 and 144 respectively of the bottom element 104. The strength of the magnetic field generated by embodiment 100 can be varied by altering the height of the raised parts 150, 151 above bottom element 104. The closer the lower face of each magnet is to bottom element 104, the stronger are the lines of force as the distance between the edges of top element 102 and bottom element 104 is reduced. Similarly, the farther the lower face of each magnet is from bottom element 104, the weaker are the lines of force. Accordingly, if the strength of the magnetic field generated by embodiment 100 is too strong for use in the intended reservoir, the height of raised parts 150, 151 of bottom element 104 can be appropriately increased and if the magnetic field is too weak, the height of raised parts 150, 151 can be appropriately decreased.

The result of the embodiments 20 and 100 is to concentrate a strong magnetic curtain in the immediate area surrounding it. Thus, water in a tank that moves only by convection current will be conditioned magnetically as the weak water movement causes the water to move slowly through the magnetic curtain. Embodiment 100 would be used in smaller reservoirs than embodiment 20.

It will be appreciated from the foregoing that the invention can take many forms consistent with utilizing polarized edges to effect a concentrated magnetic curtain. In general, the plates should be positioned to receive the lines of force from the magnets and concentrate these lines of force at the edges of the plates. This can be done with the magnets in direct contact with the plates (FIG. 4) or with a limited spacing. (FIGS. 2 and 6) Good results have also been obtained from an embodiment similar to embodiment 20 in which spaces were used only between the middle element 32 and the magnets 60, 62, 64, 66, shown in FIGS. 2 and 3. The side elements 28 and 30 were then in contact with the magnets. The ceramic magnets described above with reference to embodiments 20 and 100 can be replaced by any suitable magnet which will not corrode severely in use. For instance, a simple steel magnet in a thin casing of plastic would be suitable. Similarly, the magnet 82 (FIG. 4) could be any suitable form including ceramic or plastic coated.

In embodiment 100 one magnet or any number of magnets can be contained in an elongated top member 102 and located on a similarly elongated bottom member 104. The described effect can also be achieved by stacking flat magnets one on top of another separated by thin plates and contained in the top element. In addition the embodiment 100 can operate effectively without the end portions 116 and 118 on top element 102 with or without the end portions 116 and 118 on top element 102. The top and bottom members can be held together by bolts or fasteners or spring clips located on one member and which co-operate with an opening in the second member. Top member 102 can be made with only openings 130 and 132 or with no openings if internal lines of flux are not required or desired.

What we claim as our invention is:

1. A magnetic device for the treatment of calcareous liquid comprising:
    first and second side elements each defining a thin, generally rectangular plate having two major faces, two side edges and two end edges, the plate being divided into two similar component end portions by opposed slot-shaped openings cut from either side edge to define a neck joining said component end portions, each component end portion defining an opening in its centre;
    a third element defining an upright centre portion similar to said first and second elements and co-planar horizontal flanges dependent from the lower side edge of said upright centre portion;
    four magnets each defining two major polarized faces with an opening through the centre thereof and arranged in pairs in a spaced end-to-end relationship, each pair being positioned symmetrically on opposite sides of the upright centre portion of the third element, with similar polar faces of each magnet centrally facing the component end portion of the upright centre portion of the third element opposite it; and
    two fasteners respectively passing through the openings in adjoining component end portions of the side elements and the upright centre portion of the middle element, and the magnets located intermediate these elements to maintain the positions relative to each other.

2. A magnetic device for treating calcareous liquid in apparatus such as humidifiers, the device comprising:
    a bottom element of relatively thin magnetic material and defining a pair of feet and a central portion extending between the feet in an elevated position, the central portion including at least one raised part;
    a magnetic source having one of its magnetic poles in contact with the raised part;
    a top element of a relatively thin magnetic material in engagement with a second of the magnetic poles and having longitudinal side portions extending downwardly towards the bottom element and terminating at lower side edges adjacent but separated from the bottom element whereby a generally vertical curtain of magnetic lines of force is created between the lower side edges of said top element and adjacent edges of said bottom element for treating water passing the device; and, means coupling the top and bottom elements to one another to maintain these elements and the magnetic source in fixed relationship to one another.

3. A magnetic device as claimed in claim 2 wherein said magnetic source comprises two magnets.

4. A magnetic device as claimed in claim 2 wherein said top element further defines end portions extending downwardly towards the bottom element and terminating at lower end edges adjacent but separated from the bottom element, whereby a generally vertical curtain of magnetic lines of force is created between the lower end edges of said top element and adjacent edges of said bottom element for treating water passing the device, and wherein said lower end edges define projecting tabs dependent therefrom and said means coupling said top and bottom elements is comprised of said projecting tabs and openings defined one at each end of said bottom element, said projecting tabs adapted to co-operate with said openings to maintain the top and bottom elements and the magnetic source in said fixed relationship to one another.

5. A magnetic device as claimed in claim 2 or 3 wherein when assembled said magnets and said top and bottom elements define coaxial openings.

* * * * *